(12) United States Patent
Heber et al.

(10) Patent No.: US 8,147,136 B2
(45) Date of Patent: Apr. 3, 2012

(54) MICROMECHANICAL DEVICE WITH TEMPERATURE STABILIZATION AND METHOD FOR ADJUSTING A DEFINED TEMPERATURE OR A DEFINED TEMPERATURE COURSE ON A MICROMECHANICAL DEVICE

(75) Inventors: Jörg Heber, Dresden (DE); Thomas Klose, Dresden (DE); Thilo Sandner, Dresden (DE); Andreas Bergmann, Steina (DE); Christian Gerwig, Radebeul (DE); Thomas Knieling, Dresden (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 796 days.

(21) Appl. No.: 12/058,872

(22) Filed: Mar. 31, 2008

(65) Prior Publication Data
US 2008/0240202 A1    Oct. 2, 2008

(30) Foreign Application Priority Data

Apr. 2, 2007 (DE) .......................... 10 2007 015 719
Mar. 7, 2008 (DE) .......................... 10 2008 013 098

(51) Int. Cl.
*G01K 1/16* (2006.01)
*G01K 11/26* (2006.01)
*G01K 3/04* (2006.01)
*G01K 3/06* (2006.01)
*G01J 5/08* (2006.01)

(52) U.S. Cl. ........ 374/120; 374/141; 374/137; 374/103; 374/117; 374/208; 374/29; 374/132

(58) Field of Classification Search ................... 374/10, 374/11, 12, 16, 29, 137, 112, 115, 100, 106, 374/107, 101, 102, 103, 104, 105, 120, 134, 374/141, 43, 44, 45, 46, 55, 48, 49, 50, 117, 374/118, 119, 18, 111, 187, 208, 132; 356/43, 356/51; 359/515, 526
See application file for complete search history.

(56) References Cited

U.S. PATENT DOCUMENTS

| | | | | |
|---|---|---|---|---|
| 4,772,786 A | * | 9/1988 | Langdon ................... | 250/231.1 |
| 5,691,921 A | * | 11/1997 | Berlin .............................. | 702/99 |
| 5,969,465 A | | 10/1999 | Neukermans et al. | |
| 6,126,311 A | * | 10/2000 | Schuh .............................. | 374/21 |
| 6,297,898 B1 | | 10/2001 | Tanijiri et al. | |
| 7,154,649 B2 | * | 12/2006 | Pfefferseder et al. ...... | 359/225.1 |
| 7,572,053 B2 | * | 8/2009 | De Crecy et al. ................. | 374/5 |

(Continued)

FOREIGN PATENT DOCUMENTS
CN    1653274 A    8/2005
(Continued)

OTHER PUBLICATIONS

English language translation of a Official Communication issued in corresponding Chinese Patent Application No. 200810128792.5, mailed on Jun. 2, 2010.

(Continued)

*Primary Examiner* — Gail Verbitsky
(74) *Attorney, Agent, or Firm* — Keating & Bennett, LLP

(57) ABSTRACT

A micromechanical device includes a micromechanical functional structure and an electromagnetic radiation heating associated with the micromechanical functional structure, which is formed to cause a spatially and temporally defined temperature or a spatially and temporally defined temperature course in the micromechanical functional structure.

13 Claims, 4 Drawing Sheets

U.S. PATENT DOCUMENTS

| | | | |
|---|---|---|---|
| 7,738,158 B2 * | 6/2010 | Natarajan et al. | 359/290 |
| 7,812,502 B2 * | 10/2010 | Zalalutdinov et al. | 310/306 |
| 7,944,113 B2 * | 5/2011 | Rubel | 310/307 |
| 2002/0126400 A1 | 9/2002 | Muller-Rissmann et al. | |
| 2002/0164113 A1 * | 11/2002 | Rensing et al. | 385/18 |
| 2005/0274174 A1 * | 12/2005 | Tai et al. | 73/61.57 |
| 2006/0033980 A1 | 2/2006 | Wagner et al. | |
| 2006/0044084 A1 | 3/2006 | Cefai et al. | |
| 2006/0152313 A1 * | 7/2006 | Zmood | 335/208 |
| 2006/0158484 A1 * | 7/2006 | Greywall | 347/56 |
| 2006/0173647 A1 * | 8/2006 | Nguyen | 702/136 |
| 2006/0209262 A1 | 9/2006 | Schenk | |
| 2009/0059179 A1 * | 3/2009 | Kobori et al. | 353/52 |
| 2010/0049055 A1 * | 2/2010 | Freudenberg et al. | 600/475 |
| 2010/0144049 A1 * | 6/2010 | Combes et al. | 436/106 |

FOREIGN PATENT DOCUMENTS

| | | |
|---|---|---|
| DE | 199 63 588 A1 | 7/2001 |
| JP | 2001-004933 A | 1/2001 |
| JP | 2010187523 A * | 8/2010 |
| WO | 2005078506 A2 | 8/2005 |

OTHER PUBLICATIONS

Sandner et al.: "Highly Reflective Thin Film Coatings for High Power Applications of Micro Scanning Mirrors in the NIR-VIS-UV Spectral Region," Proceedings SPIE; vol. 6114; 2005; 12 pages.

\* cited by examiner

INTEGRATION OF AN ELECTROMAGNETIC RADIATION HEATING INTO THE MICROMECHANICAL DEVICE ～50

DEPOSITING ABSORPTION FILMS OR INTERFERENCE LAYERS ～52

STRUCTURING ABSORPTION FILMS AND INTERFERENCE LAYERS ～54

MICROMECHANICAL DEVICE WITH TEMPERATURE STABILIZATION AND METHOD FOR ADJUSTING A DEFINED TEMPERATURE OR A DEFINED TEMPERATURE COURSE ON A MICROMECHANICAL DEVICE

CROSS-REFERENCE TO RELATED APPLICATIONS

This application claims priority from German Patent Application No. 10 2007 015 719.5, which was filed on Apr. 2, 2007, and from the German Patent Application 10 2008 013 098.2, which was filed on Mar. 7, 2008, which are both incorporated herein in their entirety by reference.

TECHNICAL FIELD

The invention relates to a micromechanical device with temperature stabilization and to a method for adjusting a spatially and temporally defined temperature or a spatially and temporally defined temperature course on a micromechanical device. For example, the invention is suited for the employment of reflective-micromechanical devices in precision applications with high demands on the stability of the micromechanical device parameters, such as for display, telecommunications, laser material processing, opthalmology, laser surgery, satellite technology, microscopy, holography, and data storage applications.

BACKGROUND

In general, fields of application with significant fluctuations of a thermal flow in or one a micromechanical device by electromagnetic and/or thermal factors represent substantial fields of application of the invention. Such devices with significant fluctuation of the thermal flow by electromagnetic factors may for example be micromechanical devices with possible employment in the entire electromagnetical spectral range. This means that the micromechanical devices may operate in the visible, in the ultraviolet, in the near-infrared radiation range, in the terahertz range or in the range of soft X-ray radiation up to the radiation in the radio wave range.

Fields of application of the present invention may be devices for significant electromagnetic power densities. Such devices inherently exerting thermal action on the micromechanical device may for example be devices for the photolithography, the LIDAR earth recognition, or devices for LED, laser or maser fields of application.

Further fields of application of the present invention with significant fluctuations of the thermal flow by thermal factors, for example, represent micromechanical devices with high temperature dynamics, i.e. for example devices for the employment in the automobile technology, the satellite technology, the medial technology, the low-temperature sensor technology, the vacuum technology, or for sensor and actor devices.

Thermal stresses of reflective-micromechanical devices may lead to the alteration of important characteristic device quantities. In reflective-micromechanical devices, micromechanical-optical key parameters, such as the resonance frequency, the deflection position or the mirror planarity in the case of a scanner mirror, may change. The variations of characteristic system quantities, such as the mapping fidelity, the positioning speed, etc., resulting therefrom necessitate adequate control of the thermal flow when employing the micromechanical devices, in particular for laser precision applications. This problem of thermal instability of reflective-micromechanical devices has been known for several years.

Known methods for avoiding thermal instabilities in reflective-micromechanical devices include operating the reflective-micromechanical device at sufficiently low electromagnetic field densities, which for this reason do not cause any significant thermal input into the micromechanical device, for example.

A further possibility of reducing thermal instabilities in micromechanical devices due to the interaction of the micromechanical device with electromagnetic radiation is achieved by Sandner et al. ("Highly reflective optical coatings for high power applications of micro scanning mirrors in the UV-VIS-NIR spectral region", Proceedings SPIE, Vol. 6114 (2005)) by the generation of a high surface reflection with anti-reflection coating layers for the reduction of the thermal coupling.

Alternatively, thermal instabilities may also be achieved by a special illumination scheme in the laser operation, as this is described in WO 2005/015903 A1.

As described in the patent specification WO 2005/078506 A1, a thermal compensation flow can be generated with a localized electrical heating in different areas of the device for the adjustment of a stabilized temperature in a micromechanical device.

A temporally limited operation of the micromechanical device with "rest times" may also be performed to avoid or minimize significant thermal heating.

A further approach for diminishing thermal instabilities in reflective-micromechanical scanners is based on the special design of mechanical springs for the suspension of the scanner with optimized heat removal, or on a gas purge of the micromechanical device for heat removal.

Basically, the previously known approaches for thermal stabilization of micromechanical devices have different difficulties and/or disadvantages.

For example, the above-mentioned design changes of the mirror springs for scanner mirrors may not lead to optimum mechanical properties of these thermally optimized mirror springs.

A local electrical heating for temperature stabilization of a micromechanical device may react to temperature changes only partially and maybe with a significant temporal offset. Moreover, major thermal flow variations can only be regulated in limited cases. The operation of the micromechanical device with "rest times" places significant limitations on the operating speed of the micromechanical device and therefore is not desirable.

A special laser illumination scheme for avoiding thermal instabilities in reflective-micromechanical devices, as mentioned above, may partially be employed for the control of the thermal flow in the device. Such an illumination scheme potentially is limited, however, in the temporal and spatial dynamics with respect to the thermal flow to be compensated.

Power demands of industrial users for high precision, for example of the resonance frequency of micro-scanner mirrors in laser applications or stable operation under climatically varying conditions of application, still remain limited, however, with the above-mentioned measures for temperature stabilization.

A spatial and temporal exact stabilization of the thermal flow within the micromechanical device can be achieved only partially at present. Substantial limitations are determined by micromechanical motion elements acting almost thermally insulating, such as the mirror springs in scanner mirrors.

SUMMARY

According to an embodiment, a micromechanical device may have: a micromechanical functional structure; and an electromagnetic radiation heating associated with the micromechanical functional structure, which is formed to cause a spatially and temporally defined temperature or a spatially and temporally defined temperature course on the micromechanical functional structure.

According to another embodiment, a method for producing a micromechanical device for the use as micromechanical actor or sensor may have the step of: integration of an electromagnetic radiation heating for electromagnetic heating of the micromechanical device.

According to another embodiment, a method for adjusting a spatially and temporally defined temperature or a spatially and temporally defined temperature course in a micromechanical functional structure of a micromechanical device may have the steps of: irradiating the micromechanical functional structure with electromagnetic radiation emitted from an electromagnetic radiation heating; and adjusting a defined temporal and spatial temperature or a defined temporal and spatial temperature course in the micromechanical functional structure by irradiating.

Embodiments of the present invention allow for the defined adjustment of the thermal flow on a reflective-micromechanical device with selective high temporal and spatial resolution, as well as the predeterminable deformation of mirror faces by the combinations of the micromechanical reflectors with partially structured or completely absorbing linings or interference layers with defined layer stresses.

In embodiments, there is shown (i) control of the thermal operating point of a micromechanical device with selective high temporal resolution, (ii) the possibility for fine adjustment and for stabilization of the resonance frequency of micromechanical devices, (iii) the defined adjustment of high operating temperatures of micromechanical devices, (iv) the adjustment of the phase of a mirror deflection in the dynamic operation of a micromechanical device, (v) the application of reflective-micromechanical devices in fields of application with heavily varying thermal and electromagnetic load, and (vi) the increase of the optical power of a micromechanical device by optimized mapping properties of the reflecting mirror surface. Thereby, new fields of application in precision optics up to high-performance laser applications and in climatically extreme fields of application develop.

BRIEF DESCRIPTION OF THE DRAWINGS

Embodiments of the present invention will be detailed subsequently referring to the appended drawings, in which.

DETAILED DESCRIPTION

Figure 1:
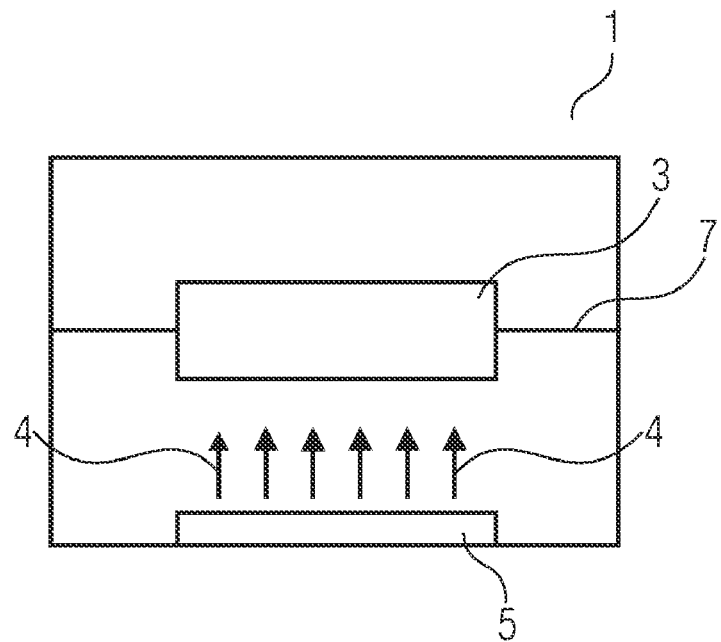
FIG. 1 is a schematic cross-sectional illustration of a micromechanical device with temperature stabilization according to an embodiment of the present invention.

A schematic cross-sectional illustration of a micro-device according to an embodiment of the present invention is illustrated in FIG. 1. A micromechanical device 1 comprises a micromechanical functional structure 3 and an electromagnetic radiation heating 5 associated with the micromechanical functional structure, which may achieve a spatially and temporally defined temperature and/or a spatially and temporally defined temperature course on the micromechanical functional structure 3 through the spatially and temporally exact emission of electromagnetic radiation 4. The micromechanical functional structure is suspended via springs 7 in the micromechanical device. The micromechanical device 1 may be a scanner mirror, and the micromechanical functional structure may be a corresponding mirror plate thereof.

As a result of thermal influences, micromechanical devices frequently comprise a change in micromechanical-optical key parameters, such as the resonance frequency, the deflection position, and the mirror planarity of a scanner mirror. These undesired variations may, among other things, be caused by irradiation with medium and high light intensities or by thermal ambient variations. These undesired variations are compensated for, according to the present invention, by targeted control of a thermal flow on the micromechanical functional structure by means of an electromagnetic radiation heating. A basic idea of the present invention on the realization of this principle is the direct heating of the micromechanical functional structure with an electromagnetic radiation heating to a temperature elevated as compared with the surrounding. This elevated temperature may for example lie between 35° C. and 50° C., e.g. 40° C., that is.

With the influence of external thermal variations by heat supply, e.g. by laser radiation in the display or scanner operation, leading to a temperature increase or also to a cooling, the mean temperature of the optically effective mirror portions of a functional structure may be adapted and/or compensated by temporal and perhaps spatial intensity modulation of the electromagnetic radiation heating 5. This means, temperature variations become capable of being regulated for the micromechanical device by adapted alteration of the internal heat flow.

As already described above, the micromechanical functional structure 3 may be a mirror plate of a scanner mirror, for example formed in a silicon structure and suspended on torsion springs in a frame structure. The electromagnetic radiation heating 5 may be below the mirror plate and heat same to the desired temperature from the backside. Alternatively, the electromagnetic radiation heating associated with the micromechanical functional structure may be arranged outside the micromechanical device 1 and interact with the micromechanical functional structure to bring same to spatially and temporally defined temperature and/or generate a spatially and temporally defined temperature course therein. By the employment of a radiation heating, e.g. the thermally insulating action of the mirror springs 7 of the micromechanical scanner device 1 may be circumvented for the control of the thermal flow on the mirror device 3. By the heating with the electromagnetic radiation emitted from the electromagnetic radiation heating, heat flows of very high intensity may be introduced into the micromechanical system by means of variable light sources, which serve as radiation heating, both in temporally and spatially resolved manner. What results therefrom is a great variety of thermal regulation possibilities for the micromechanical device, beginning with fixedly defined radiation heating flows, caused by the electromagnetic radiation absorbed by the micromechanical functional structure, to time-modulated feedback circuits. The electromagnetic radiation heating thus allows for comprehensive manipulation, for example of the mirror temperature of a scanner, and hence represents a significant extension over the previous technology.

Figure 2:
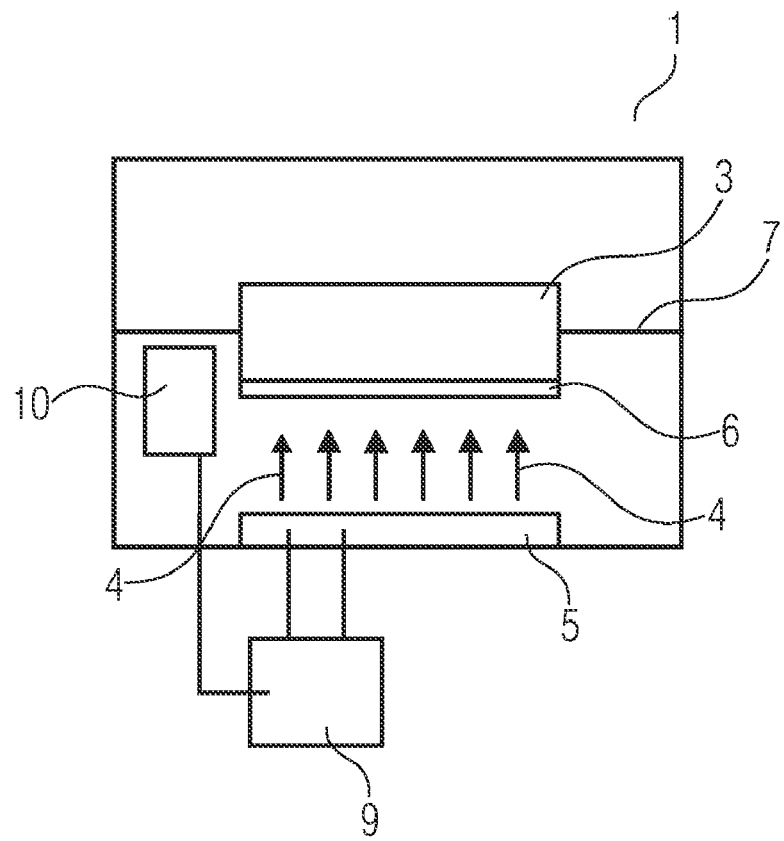
FIG. 2 is a further cross-sectional illustration of an embodiment of the present invention with an absorption and/or interference layer, a controller, and a sensor.

A further embodiment of the present invention is illustrated in FIG. 2. In the schematic cross section of the micromechanical device 1, there is again a micromechanical functional structure 3, which is suspended on the torsion springs 7. The micromechanical functional structure 3 may comprise partial or whole-area absorption or interference layers 6, which have a high absorption with respect to an electromagnetic radiation 4 emitted from the electromagnetic radiation heating 5. Thereby, it can be guaranteed that the micromechanical functional structure 3 can be brought to a defined temperature quickly and efficiently also with respect to the power consumption of the electromagnetic radiation heating.

The micromechanical device 1 may further comprise a controller 9, which is operatively connected to the electromagnetic radiation heating for adjustment of the spatially and temporally defined temperature or the spatially and temporally defined temperature course on the micromechanical functional structure. The controller 9 may be integrated in the micromechanical device or also be operatively connected to the electromagnetic radiation heating via external control lines.

The controller may be formed to vary a radiation power given off by the electromagnetic radiation heating. To this end, the controller may be formed so as to receive an internal or an external control signal, so that an alteration of the radiation power given off takes place thereupon.

The electromagnetic radiation heating may further comprise an associated sensor 10, which is operatively connected to the control device and modulates the radiation power of the electromagnetic radiation heating depending on an internal or external sensor or control signal generated by this sensor, so that the resonance frequency or another important functional device parameter of the micromechanical device, for example, can be regulated.

By the targeted heating of the mirror plate 3, a predeterminable deformation of the mirror faces by a combination of the micromechanical reflectors with partially structured or completely absorbing linings 6 or interference layers with defined layer stresses may be achieved. This means, the micromechanical functional structure may comprise absorption layers or interference layers for a certain wavelength range of the electromagnetic radiation heating, so that a predeterminable deformation of the micromechanical functional structure can be achieved by the radiation with the electromagnetic radiation heating.

In embodiments, the electromagnetic radiation heating 5 may be associated with the mirror plate 3, so that the upper side or the lower side can be brought to a spatially temporally defined temperature or a spatially and temporally defined temperature course by the emitted electromagnetic radiation.

Figure 3:
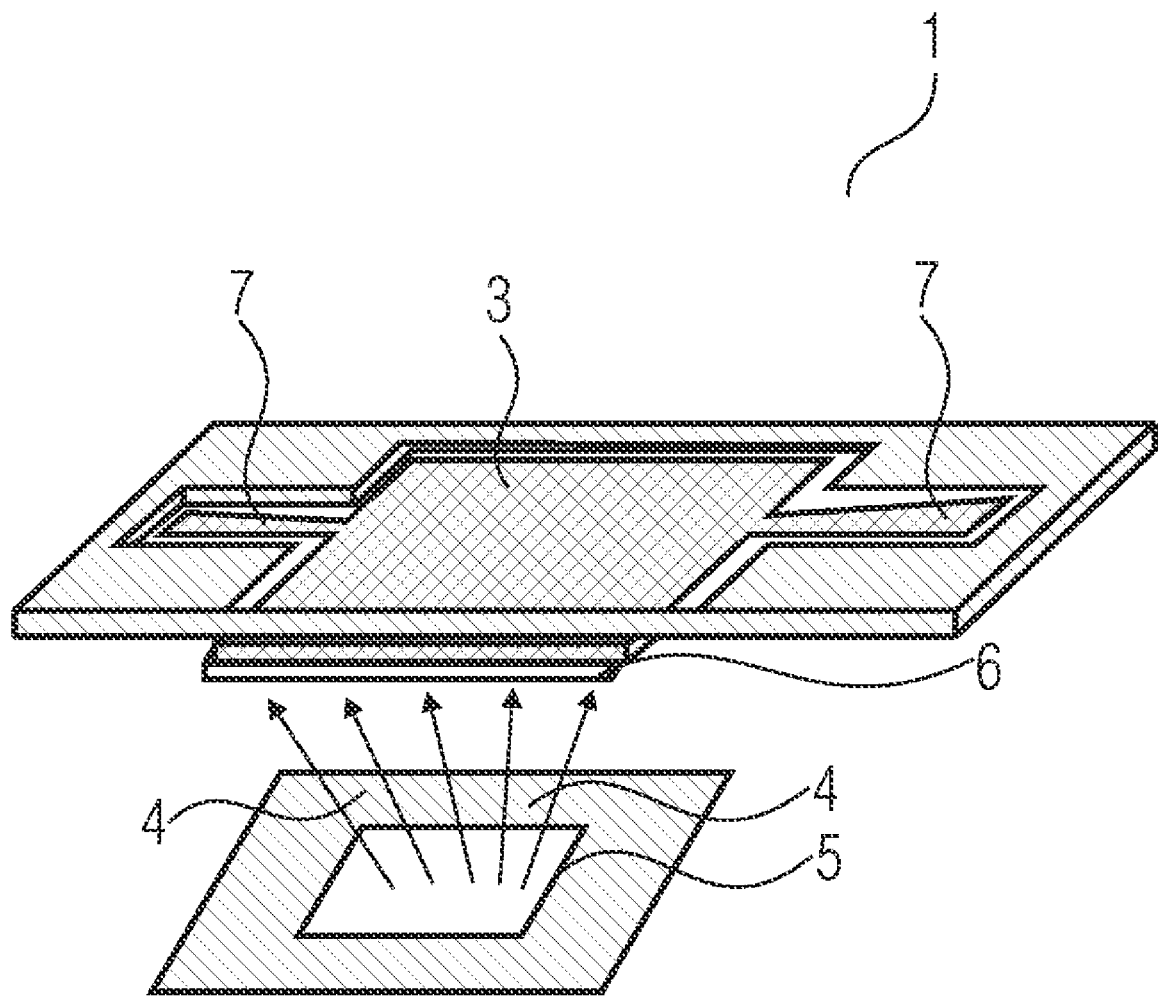
FIG. 3 is a schematic illustration of a scanner mirror with optical temperature stabilization according to a further embodiment of the present invention.

A further embodiment of the present invention is illustrated in FIG. 3. The micromechanical device illustrated is a laser scanner device 1 for light modulation of a pulsed high-power ultraviolet laser system. Partially absorbed ultraviolet laser radiation may lead to detuning of the modulator resonance frequency of the laser scanner device. By the integration of an efficient organic light-emitting (OLED) light source 5, which serves as radiation heating with highest energy efficiency, for example in the green spectral range, below the scanner mirror 3, this detuning of the modulator resonance frequency can be prevented with a minimum power need of the radiation heating. This may be done by thermal temperature stabilization of the scanner mirror by means of the OLED radiation heating.

The scanner mirror 3 may comprise a spectrally adapted absorber layer for the green spectral range of the OLED on the bottom side of the scanner mirror 3. Thereby, also minimum power need of the radiation heating may be ensured as well.

The micromechanical device 1 may further comprise means for modulation of the OLED light source with a temporally coupled pulse operation with respect to the ultraviolet useful signal. This means for modulation of the electromagnetic radiation heating 5 may be an internal or an external control device for the light intensity of the electromagnetic radiation heating. Thermal compensations of the overall system and stabilization of the resonance frequency of the scanner mirror may be achieved by the control device with minimum electrical power. To this end, the scanner device 1 may be adjusted by the power modulation of the OLED to an almost constant operating temperature above ambient temperature.

The micromechanical devices illustrated in the embodiments may be a reflective-micromechanical device for the employment as micromechanical actor or sensor. Here, the device may comprise an electromagnetic source with at least one predeterminable wavelength, which is determined by the absorption material properties of the micromechanical device or at least one of its coatings and may be used for electromagnetic heating of the reflective-micromechanical device.

The micromechanical device may also be employed for the optical modulation of systems, which comprise OLED, light-emitting diode (LED), laser or maser radiation sources.

The electromagnetic heating with its radiation field may for example irradiate partial areas of the micromechanical functional structure or the entire micromechanical functional structure. If the micromechanical functional structure is a mirror plate, either the entire mirror plate or only parts of the optically effective mirror area may be irradiated by the electromagnetic radiation heating. If the micromechanical functional structure is a reflective, mirrored functional structure, for example, the electromagnetic heating may become directly effective on the optically utilized reflecting mirror structure or the face opposite thereto.

In another embodiment, the electromagnetic radiation heating may also be used to correct or adjust the phase location of the mirror deflection of the scanner mirror. The spring-suspended scanner mirror may be regarded as an oscillating system, which e.g. periodically experiences electric excitation to maintain the oscillation. For this reason, this oscillation may be described with a certain phase location. Correspondingly, the oscillating system with the mirror plate may also have a resonance frequency, which can be defined or adjusted by the electromagnetic radiation heating depending on a predeterminable algorithm.

This algorithm may for example control the temporal and spatial emission of the electromagnetic radiation heating by an external or internal control device in which the algorithm is stored, such as a computer or a CPU. The electromagnetic radiation heating may thus regulate the resonance frequency of the micromechanical device depending on an internal or external sensor signal.

The electromagnetic radiation heating may also regulate the temperature, and hence the resonance frequency, of the micromechanical device depending on an external radiation source in the optical system.

The electromagnetic radiation heating may be a laser diode, a light-emitting diode (LED), an organic light emitting diode (OLED), a laser, a maser or also a ceramic heater rod, for example.

In a further embodiment of the present invention, scattering proportions, reflection proportions or direct radiation proportions of the electromagnetic radiation emitted from the radiation heating may be utilized for detection or adjustment of device properties of the micromechanical device. These scattering, reflection or direct radiation proportions of the electromagnetic radiation heating may also be utilized for detection or adjustment of the mirror position, the deflection phase or the resonance frequency of a scanner mirror.

According to a further embodiment, proportions of the heating radiation may be used for detection or adjustment of the mirror planarity, mirror deformation or the mirror temperature of a reflective-optical device.

According to embodiments, the micromechanical device may have absorption areas or interference layers for optimized absorption of the electromagnetic radiation of the radiation heating. The absorption areas or interference layers may have been deposited or structured partially or completely on surfaces of the micromechanical device.

In further embodiments, the micromechanical device may have absorption films or interference layers with predeterminable layer stresses for thermally modulatable deformation of the mirror area with the aid of the electromagnetic radiation heating. The absorption films or interference layers with predeterminable layer stresses may partially or completely have been deposited and structured on surfaces of the micromechanical device.

Figure 4:
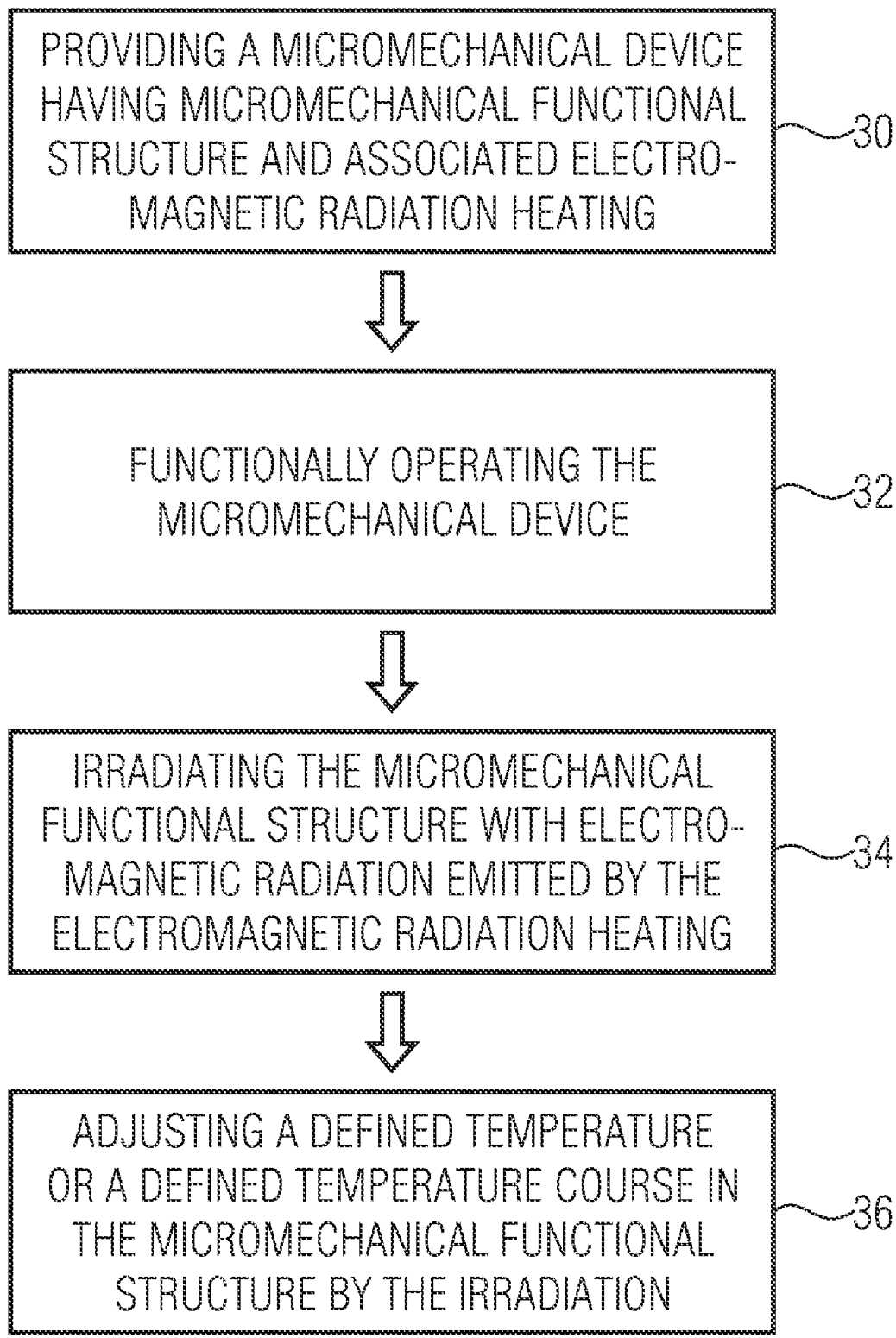
FIG. 4 is a flow chart relating to the method for adjusting a defined temperature or a defined temperature course in a micromechanical device according to the present invention.

A flow chart of the method for the adjustment of a defined temperature or a defined temperature course in a micromechanical functional structure of a micromechanical device is illustrated in FIG. 4.

The method for adjusting a spatially and temporally defined temperature or a spatially and temporally defined temperature course in a micromechanical functional structure of a micromechanical device, with an electromagnetic radiation heating associated with the micromechanical functional structure, may comprise providing 30 as well as functionally operating 32 the micromechanical device. The method further comprises irradiating 34 the micromechanical functional structure with electromagnetic radiation, which is emitted from the electromagnetic radiation heating, and adjusting 36 a spatially and temporally defined temperature or a spatially and temporally defined temperature course of the micromechanical functional structure by irradiating 34.

Irradiating 34 the micromechanical functional structure for the adjustment of a defined spatial and temporal temperature or a spatially and temporally defined temperature course by the electromagnetic radiation heating may be performed so that the intensity of radiation emitted from the electromagnetic radiation heating is varied in temporally predeterminable manner.

The irradiation of the micromechanical functional structure may be performed so that it regulates the adjustment of the defined temperature or the defined temperature course of the micromechanical functional structure depending on an internal or external sensor signal.

To this end, the method may further comprise controlling the spatial and temporal emission of heating radiation of the electromagnetic radiation heating. Adjusting 36 may be performed as controlling. The controlling may be done with the aid of sensor signals of a sensor, which monitors certain device properties and transmits sensor signals to a control means, which thereupon controls the electromagnetic radiation heating.

In another embodiment of the invention, the controlling may also be performed according to a predetermined algorithm, which is why also no sensor signal is necessary then.

In embodiments, irradiating the micromechanical functional structure may take place with an electromagnetic radiation heating arranged outside the micromechanical device. The adjustment 36 of a defined temperature by the electromagnetic radiation heating of the micromechanical device may be performed so that the defined temperature lies at least 5° C. above the ambient temperature of the micromechanical device.

Figure 5:
FIG. 5 is a flow chart relating to the method for producing a micromechanical device for the application as micromechanical actor or sensor.
Figure 5:

Furthermore, the present invention includes a method for producing a micromechanical device. The method (FIG. 5) comprises an assembly 50 or an integration of an electromagnetic radiation heating into the micromechanical device, wherein the micromechanical device may be a reflective-micromechanical device, for the employment as micromechanical actor or sensor. The device may comprise an electromagnetic source with at least one predeterminable wavelength, wherein the wavelength is determined by absorbing material properties of the device or at least one of its coatings.

The method for producing the micromechanical device may further comprise depositing 52 and structuring 54 absorption films or interference layers, partially or completely on surfaces of the micromechanical device, for optimized absorption of the emitted electromagnetic radiation of the radiation heating.

According to other embodiments, the method may further comprise depositing 52 and structuring 54 absorption films or interference layers with default layer stresses, partially or completely on surfaces of the reflective-micromechanical device, for thermally modulatable deformation of a mirror area of a reflective-micromechanical device, by means of applied radiation heating. It is to be pointed out that the order of the production steps indicated in FIG. 5 does not represent any limitation, since the production steps are interchangeable.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A micromechanical device, comprising:
a suspension;
a micromechanical functional structure suspended by the suspension in the micromechanical device;
an electromagnetic radiation heating element arranged such that a radiation field of the electromagnetic radiation heating element irradiates a surface of the micromechanical functional structure partially or entirely to cause a spatially and temporally defined temperature or a spatially and temporally defined temperature profile on the micromechanical functional structure; and
a controller operatively connected to the electromagnetic radiation heating element and configured to adjust the spatially and temporally defined temperature or the spatially and temporally defined temperature profile; wherein
the micromechanical functional structure is a spring-suspended scanner mirror which is configured to be periodically excited by an oscillating system to maintain an oscillation; and
the spring-suspended scanner mirror has a resonance frequency that is controllable based on predetermined algorithm by the electromagnetic radiation heating element.

2. The micromechanical device according to claim 1, wherein the controller is configured to vary radiation power given off by the electromagnetic radiation heating element.

3. The micromechanical device according to claim 1, wherein the controller is configured to receive an internal or an external control signal.

4. The micromechanical device according to claim 1, further comprising one or more absorption or interference layers, which are arranged on the micromechanical functional structure, wherein the one or more absorption or interference layers are configured to effectively absorb the radiation power given off by the electromagnetic radiation heating element.

5. The micromechanical device according to claim 3, further comprising a sensor arranged to provide the internal or the external control signal.

6. The micromechanical device according to claim 1, wherein the micromechanical functional structure is configured to operate in one of the visible, the ultraviolet, the infrared, the terahertz, the X-ray, or the radio wave radiation range.

7. The micromechanical device according to claim 1, wherein the micromechanical functional structure comprises a reflective-micromechanical functional structure.

8. The micromechanical device according to claim 1, wherein predetermined properties of the micromechanical functional structure are adjustable by radiation power given off by the radiation heating element.

9. The micromechanical device according to claim 8, wherein the micromechanical functional structure comprises a mirrored micromechanical functional structure, wherein at least one of the following predetermined properties of the mirrored micromechanical functional structure is adjustable: the position of the mirrored micromechanical functional structure, the deflection phase, the resonance frequency, the planarity, a defined deformation of the mirrored micromechanical functional structure.

10. The micromechanical device according to claim 1, wherein the micromechanical functional structure is configured as a mirror plate of a mirror scanner.

11. The micromechanical device according to claim 1, wherein the electromagnetic radiation heating element includes one of a laser diode, a light-emitting diode, an organic-light-emitting diode, a laser, a maser, or a ceramic heater rod.

12. The micromechanical device according to claim 1, wherein the electromagnetic radiation heating element is arranged to direct the radiation field to an optically utilized mirror surface of the micromechanical functional structure or to a surface opposite thereto.

13. The micromechanical device according to claim 1, wherein the electromagnetic radiation heating element comprises an external radiation source.

* * * * *